US008063378B2

(12) United States Patent
Bolotnikov et al.

(10) Patent No.: US 8,063,378 B2
(45) Date of Patent: Nov. 22, 2011

(54) HIGH-ENERGY DETECTOR

(75) Inventors: Aleksey E. Bolotnikov, South Setauket, NY (US); Giuseppe Camarda, Farmingville, NY (US); Yonggang Cui, Upton, NY (US); Ralph B. James, Ridge, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 301 days.

(21) Appl. No.: 12/056,655

(22) Filed: Mar. 27, 2008

(65) Prior Publication Data

US 2009/0026371 A1    Jan. 29, 2009

Related U.S. Application Data (60) Provisional application No. 60/909,023, filed on Mar. 30, 2007.

(51) Int. Cl.
*G01T 1/24* (2006.01)
*G01T 1/00* (2006.01)

(52) U.S. Cl. ............................ 250/370.01; 250/336.1

(58) Field of Classification Search .................. None
See application file for complete search history.

(56) References Cited

U.S. PATENT DOCUMENTS

| | | |
|---|---|---|
| 5,530,249 A | 6/1996 | Luke |
| 6,175,120 B1 | 1/2001 | McGregor et al. |
| 6,528,797 B1 | 3/2003 | Benke et al. |
| 6,781,132 B2 | 8/2004 | McGregor |

FOREIGN PATENT DOCUMENTS

SU    1264723 A    9/1990

OTHER PUBLICATIONS

NASA Swift Mission webpage, National Aeronautics and Space Administration, Jun. 26, 2007 <URL: http://www.nasa.gov/mission_pages/swift/bursts/double_supernova.html>.
P.N. Luke, "Single-Polarity Charge Sensing in Ionization Detectors Using Coplanar Electrodes," Appl. Phys. Lett. 65(22), pp. 2884-2886, 1994.
K. Parnham and Cs. Szeles, K.G. Lynn and R. Tjossem, "Performance Improvement of CdZnTe Detectors Using Modified Two-Terminal Electrode Geometry," accepted for publication in Hard X-Ray, Gamma-Ray and Neutron Detector Physics, Proceedings of SPIE, 1999.
Ritec, Inc., Riga, Latvia, Feb. 17, 2005 <URL: http://www.ritec.lv/Html/pub.html>.

(Continued)

*Primary Examiner* — David Porta
*Assistant Examiner* — Carolyn Igyarto
(74) *Attorney, Agent, or Firm* — Dorene M. Price (57) ABSTRACT

The preferred embodiments are directed to a high-energy detector that is electrically shielded using an anode, a cathode, and a conducting shield to substantially reduce or eliminate electrically unshielded area. The anode and the cathode are disposed at opposite ends of the detector and the conducting shield substantially surrounds at least a portion of the longitudinal surface of the detector. The conducting shield extends longitudinally to the anode end of the detector and substantially surrounds at least a portion of the detector. Signals read from one or more of the anode, cathode, and conducting shield can be used to determine the number of electrons that are liberated as a result of high-energy particles impinge on the detector. A correction technique can be implemented to correct for liberated electron that become trapped to improve the energy resolution of the high-energy detectors disclosed herein.

27 Claims, 11 Drawing Sheets

OTHER PUBLICATIONS

"Theory of the Hemispherical Detector Operation," Feb. 17, 2005 <URL: http://www.ritec.lv/Html/pubthe.html>.

V. Ivanov, A. Loutchanski, V. Garbusin, P. Dorogov RITEC Ltd., R. Arlt IAEA, "New Possibilities of Room Temperature Semiconductor Detectors with Using of a Modern Pulse Processing Methods," Feb. 17, 2005 <URL: http://www.ritec.lv/Html/pubsum.html>.

V.I. Ivanov, V. Garbusin, P.G. Dorogov, A.E. Loutchanski, V.V. Kondrahov Baltic Scientific Instruments, RITEC Ltd., "Spectrometric Characteristic improvement of CdTe Detectors," Feb. 17, 2005 <URL: http://www.ritec.lv/Html/pubabs.html>.

C. Szeles, D. Bale, J. Grosholz, Jr., G.L. Smith, M. Blostein, and J. Eger, "Fabrication of High Performance CdZnTe Quasi-Hemispherical Gamma-Ray CAPture™ Plus Detectors," Hard X-Ray and Gamma-Ray Detector Physics VIII, edited by Larry A. Franks, Arnold Burger, and Ralph B. James, Proceedings of SPIE vol. 6319, p. 191 (SPIE, Bellingham, WA, 2006).

G. Montémont, M. Argues, L. Verger, and J. Rustique, "A Capacitive Frisch Grid Structure for CdZnTe Detectors," *IEEE Trans. Nucl. Sci.*, vol. 48(3), pp. 278-281, 2001.

H.H. Barrett, J.D. Eskin, and H.B. Barber, "Charge Transport in Arrays of Semiconductor Gamma-Ray Detectors," *Physical Review Letters, The American Physical Society*, 75(1), p. 156, 1995.

A. Kargar, A.M. Jones, W.J. McNeil, M.J. Harrison, D.S. McGregor, "CdZnTe Frisch Collar Detectors for γ-Ray Spectroscopy," *Nuclear Instruments and Methods in Physics Research*, A558, pp. 487-503 (2006).

A.E. Bolotnikov, G.C. Camarda, G.A. Carini, M. Fiederle, L. Li, D.S. McGregor, W. McNeil, G.W. Wright, R.B. James, "Performance Characteristics of Frisch-Ring CdZnTe Detectors," *IEEE Trans. Nucl. Sci.*, vol. 53 (2), pp. 607-614, 2006.

O. Bunemann, T.E. Cranshaw, and J.A. Harvey, "Design of Grid Ionization Chambers,"*Can. J. Res.*, A27, pp. 191-247 (1949).

F. Zhang, Z. He, D. Xu, G.F. Knoll, D.K. Wehe, and J.E. Berry, "Improved Resolution for 3-D Position Sensitive CdZnTe Spectrometers," *IEEE Trans. Nucl. Sci.*, vol. 51(5), pp. 2427-2431, 2004.

Y. Cui, A.E. Bolotnikov, G.S. Camarda, G.A. Carini, G. DeGeronimo, P. O'Connor, R.B. James, A. Kargar, M.J. Harrison, and D.S. McGregor, "Readout System for Arrays of Frisch-Ring CdZnTe Detectors," *IEEE Transactions on Nuclear Science*, in press, pp. 3675-3679, 2007.

A.E. Bolotnikov, G.S. Camarda, G.A. Carini, G.W. Wright, D.S. McGregor, W. McNeil, R.B. James, "New Results from Performance Studies of Frisch-Grid CdZnTe Detectors," SPIE, 5540, pp. 33-45, 2004.

Advanced Polymers, Inc., 29 Northwestern Drive, Salem, NH 03079, 2007 <URL: http://www.advpoly.com/Products/ShrinkTubing/Default.aspx>.

A.E. Bolotnikov, G.S. Camarda, G.A. Carini, M. Fiederle, L. Li, G.W. Wright, and R.B. James, "Performance Studies of CdZnTe Detector by Using a Pulse Shape Analysis," in Proceedings of SPIE Hard X-Ray and Gamma-Ray Detector Physics VII, edited by R.B. James, L.A. Franks, and A. Burger (SPIE, Bellingham, WA, 2005), 58200K-1-59200K-12.

B.H. Parker, C.M. Stahle, D. Roth, S. Babu, J. Tueller, "The Effect of Twin Boundaries on the Spectroscopic Performance of CdZnTe Detectors," in Hard X-Ray and Gamma Ray Detector Physics III, R. James ed., Proc. SPIE, vol. 4507, pp. 68-78, 2001.

S.A. Soldner, A.J. Narvett, D.E. Covalt, and C. Szeles, "Characterization of the Charge Transport Uniformity of CdZnTe Crystals for Large-Volume Nuclear Detector Applications," *IEEE Trans. Nucl. Sci.*, vol. 51(5), pp. 2443-2447, 2001.

A.E. Bolotnikov, G.S. Camarda, G.A. Carini, Y. Cui, L. Li, R.B. James, "Cumulative Effects of Te Precipitates in CdZnTe Radiation Detectors," *Nucl. Instruments and Methods in Physics Research*, A571, pp. 687-698, 2007.

W. Shockley, "Currents to Conductors Induced by a Moving Point Charge," *J. Appl. Phys.* 9, pp. 635-636, 1938.

A. Bolotnikov, A. Bolozdynya, R. DeVito, J. Richards, "Dual-Anode High-Pressure Xenon Cylindrical Ionization Chamber," *IEEE Trans. Nucl. Sci.*, vol. 51(3), pp. 1006-1010, 2004.

HIGH-ENERGY DETECTOR

This application claims priority to U.S. Provisional Application No. 60/909,023 filed on Mar. 30, 2007, which is incorporated by reference herein in its entirety for all purposes.

This invention was made with Government support under contract number DEAC02-98CH10886, awarded by the U.S. Department of Energy. The Government has certain rights in the invention.

BACKGROUND OF THE INVENTION

Virtual Frisch-grid detectors represent a class of single-carrier devices for which fast-moving electrons are used to measure energies deposited by X-rays, gamma-rays, ionizing particles, and the like. A main drawback of single carrier devices is that the output signals are influenced by the stationary holes whose effects depend on the locations of interaction points inside the device. Such behavior of the output signals, caused by uncollected holes, is commonly called the "induction effect." This effect inhibits spectral resolution of single-carrier detectors unless special measures are implemented to neutralize the holes. Two techniques directed to minimizing the induction effect are: (1) subtracting the fraction of the charge signal contributed by the stationary holes and (2) electrostatic shielding of the stationary holes.

In the first technique, the induced charge contributed by the holes is measured and subtracted from the total output signal. The holes-induced signal can be measured with one or several electrodes located adjacent to the collecting electrode. The electrodes can be composed of pixels or strips and, depending on the locations of interaction points, the same electrode can be used for measuring collected or induced-only charges. Coplanar-grid devices proposed for Cadmium Zinc Telluride (CdZnTe or CZT) and fluid Xenon (Xe) detectors are special cases for implementing this technique.

For the second technique, there are two types of devices that employ the electrostatic shielding: Frisch-grid and virtual Frisch-grid detectors. In a classic Frisch-grid ionization chamber, a metal grid (or mesh) is used for electrostatic shielding of the collecting electrode (or several collecting electrodes) from the positive ions. In a virtual Frisch-ring detector, the shielding electrode (or several electrodes) is placed around the sides of the device's sensitive volume but they produce essentially the same shielding effect as if a real Frisch grid were placed inside the detector.

In the past, several designs of virtual Frisch-grid detectors were proposed for CdZnTe semiconductor: CAPture™, hemispherical, Frisch-ring, and pixel detectors. (CAPture™ is a trademark of eV Products, Inc. of Saxonburg, Pa.). CAPture™-type and hemispherical type detectors are generally produced by extending the cathode electrode up the sides of the detector crystal body. In both devices, the extended electrodes are in physical contact with the semiconductor surfaces. As a result, a wide area of the bare detector crystal body surface surrounding the anode is required to keep the surface leakage current below an acceptable level. While these convention devices typically achieve acceptable results for low energy gamma-rays, which normally interact close to the cathode, these conventional devices typically do not perform as well for higher energy gamma-rays that interact closer to the anode. Since the area near the anode is not properly shielded, convention Frisch-grid detectors usually exhibit low energy tails for peaks in the pulse height spectra.

Figures 1A, 1B:
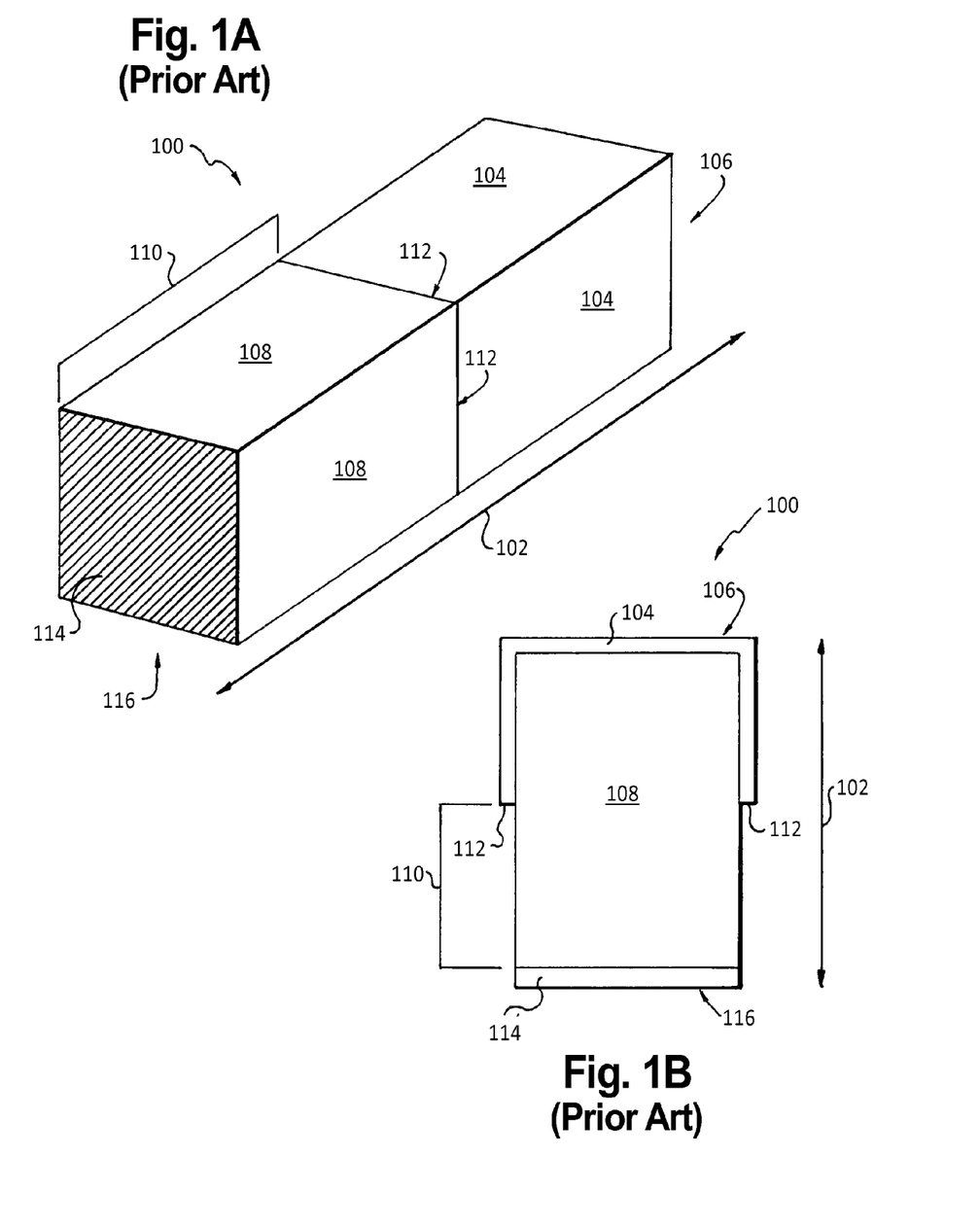
FIGS. 1A-B depict a perspective view and a cross-sectional view, respectively, of a conventional configuration of a gamma-ray detector.

FIG. 1A depicts a perspective view of a conventional virtual Frisch-grid detector 100 and FIG. 1B depicts a cross-sectional view along a longitudinal axis 102 of the conventional virtual Frisch-grid detector 100. In this example, the conventional virtual Frisch-grid detector 100 is a CAPture™-type detector that has an extended cathode 104 formed at one end 106 of a detector crystal 108. An unshielded and uninsulated area 110 lies between the cathode's edge 112 and an anode 114 formed at the other end 116 of the detector crystal 108; thereby leaving the detector crystal susceptible to electrostatic interference.

In conventional Frisch-ring detectors, the cathode is also extended along the longitudinal surface of the detector, but the extended portion of the cathode is physically separated from the longitudinal surface by a thin layer of insulating material. The non-contacting electrode, also known as the non-contacting Frisch ring, is the main feature that makes Frisch-ring detectors different from CAPture™ and hemispherical-type devices. The non-contacting electrode is placed along the longitudinal surface of the crystal and is physically connected to the cathode. A common high-voltage bias (with respect to the anode) is applied to the cathode and the non-contacting electrode. The output signal is read out from the anode. Thus, a gap (typically 2-3 mm) of insulating material is generally left between the Frisch-ring and the anode's contact to prevent high leakage current or even possible discharge in the area between these two electrodes. As a result, an electrostatically unshielded area of the surface exists near the anode, which results in a low energy tailing effect discussed above.

Figures 2A, 2B:
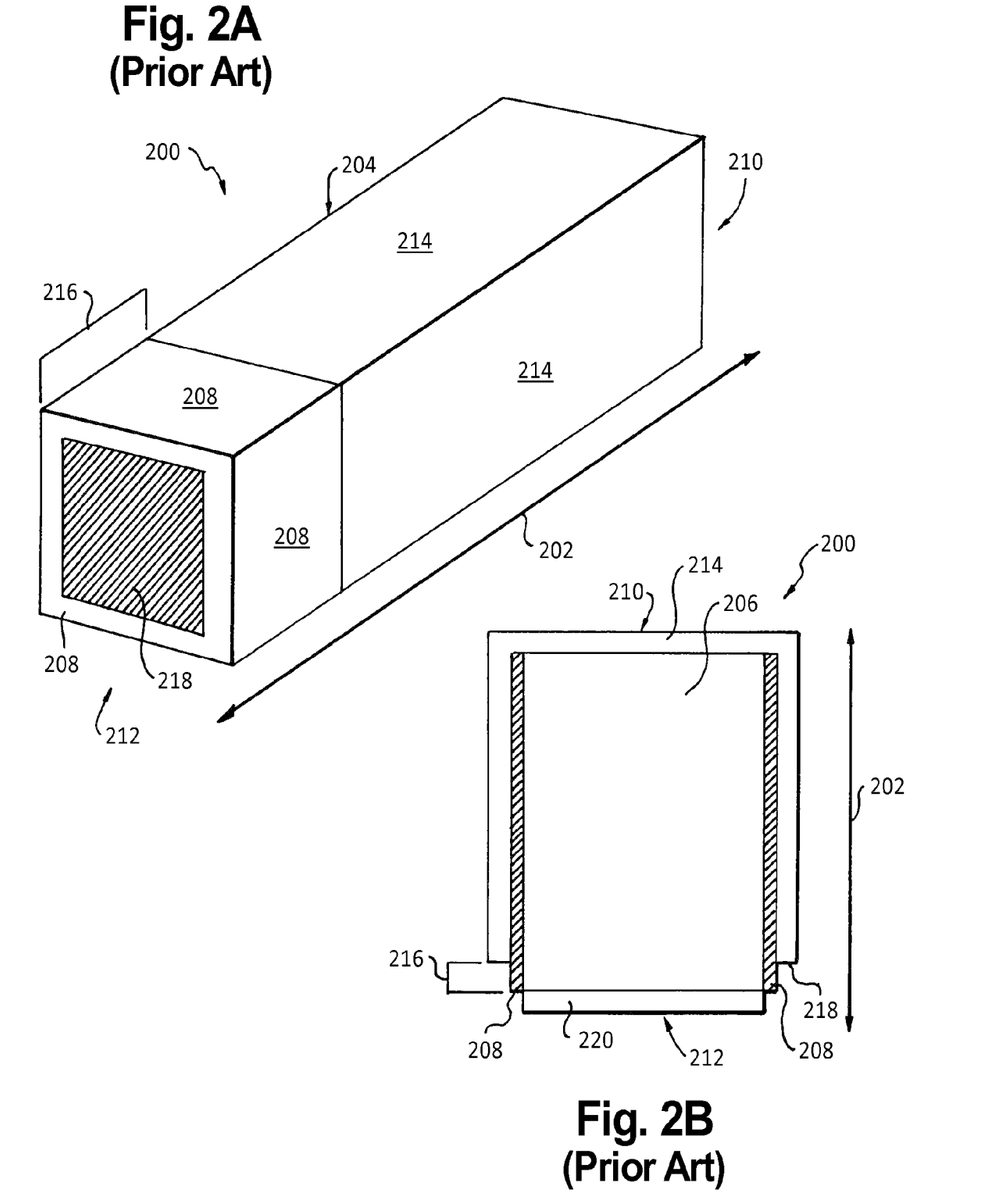
FIGS. 2A-B depict a perspective view and a cross-sectional view, respectively, of another conventional configuration of a gamma-ray detector.

FIG. 2A depicts a perspective view of a conventional Frisch-ring detector 200 and FIG. 2B depicts a cross-sectional view along the longitudinal axis 202 of the conventional Frisch-ring detector 200. In this example, the longitudinal surface 204 of the detector crystal 206 is insulated with an insulator 208 leaving only the ends 210 and 212 available for making electrical contact. The cathode 214 is extended along the longitudinal length of, but electrically isolated from, the detector crystal 206. However, an unshielded area 216 between the edge 218 of the cathode 214 and an anode 220 is generally required to prevent leakage current or even electrical discharge between the cathode 214 and the anode 220.

Conventional virtual Frisch-grid detectors generally have three common effects that result in degradation of their performance. The first effect that degrades their performance is the presence of an unshielded area near the anode. The second effect that degrades their performance is that the electric field inside the detector (drift field) does not generally direct electrons, liberated by the incident photons or particles, toward the anode (defocusing field). The third effect that degrades their performance is the two-terminal nature of devices in which the cathode signal cannot provide the particle's interaction depth information to correct the electron losses due to trapping.

SUMMARY OF THE INVENTION

The preferred embodiments of the present invention relate to high energy detectors, such as X-ray, gamma ray, ionizing particle detectors, and the like, and more particularly to virtual Frisch-grid radiation detectors operating as single-carrier-transport devices that can be operated at room temperature. The high-energy detector can include a first electrical conductor, a second electrical conductor, a third electrical conductor, an insulator, and a detector crystal with a longitudinally extending body.

The detector crystal body can have a rectangular cross-section, circular cross-section, or an elliptical cross-section. For the embodiment where the detector crystal body has a rectangular cross-section the ratio of a length of the longest side of the cross-section to the longitudinal length of the detector crystal body can be less than one. The detector crystal body is in electrical contact with, and bounded by, the first electrical conductor formed at a first end, which represents a cathode, and the second electrical conductor formed at a second end, which represents an anode. A different electrical potential can be applied to the first and second electrical conductors to create an electric field within the body that is sufficient to direct liberated electrons towards the second electrical conductor. The first electrical conductor can extend along and be in direct contact with a first portion of the longitudinal surface of the detector crystal body At least a portion of the longitudinal surface is substantially surrounded by the third electrical conductor, which extends to the second end. The third electrical conductor is electrically isolated from the body and the first electrical conductor by the insulator which is disposed about the longitudinal surface of the detector crystal body. The detector crystal body is electrically shielded by the first, second, and third electrical conductors so that the body is substantially shielded from electrostatic interference.

The third electrical conductor comprises at least one of copper and aluminum and can have an electrical potential that is substantially equal to that of the second electrical conductor. The insulator can extend from the second end to the first end and beyond and can be formed from at least one of polyester, polyethylene, polytetraflouroethylene, and a polyimide. In one embodiment, the insulator is composed of a tube of heat-shrinkable polymer within which the detector crystal body is positioned and to which heat sufficient to shrink said tube is applied so that the tube contracts onto the detector.

For the embodiment where the first electrical conductor extends from the first end of the body along a first portion of the longitudinal surface of the body, the third electrical conductor surrounds a second portion of the longitudinal surface of the body, where the first and second portion can, but do not necessarily overlap. The insulator can surround the longitudinal surface of the detector crystal body so that an inner surface of the first electrical conductor is in direct electrical contact with the longitudinal surface of said body and an outer surface of the first electrical conductor is in contact with the insulator.

In one embodiment high-energy can be detected by applying a first electrical potential at an anode disposed on a first end of a detector crystal body to a first potential, applying a second electrical potential at a cathode disposed on a second end of said detector crystal body, and applying a third electrical potential to an electrically conducting shield, where the third electrical potential is substantially equal to the second electrical potential. An output is read at the anode that corresponds to a number of liberated electrons collected by the anode and an output is read at the cathode that corresponds to a number of trapped electrons. The number of originally liberated electrons is determined based on the number of collected electrons and the number of trapped electrons. For example, the number of originally liberated electrons can be determined by summing the number of collected electrons with the product resulting from multiplying the number of trapped electrons by a correction factor.

The preferred embodiments of the inductive sealing unit, as well as other objects, features and advantages of the present invention will be apparent from the following detailed description, which is to be read in conjunction with the accompanying drawings wherein like reference numerals in the various figures are utilized to designate like components. The scope of the invention will be pointed out in the claims.

DETAILED DESCRIPTION OF THE PREFERRED EMBODIMENTS

The preferred embodiments of the present invention are directed to a high-energy detector that is substantially shielded from electrostatic interference. The high-energy detector can include a detector crystal that is preferably formed using a semiconductor material, such as Cadmium Zinc Telluride (CdZnTe or CZT), Cadmium Telluride (CdTe), Mercury Iodide (HgI2), and the like, which is substantially shielded from electrostatic interference by electrical conductors that can include a cathode, an anode, and a conducting shield where the conducting shield is electrically decoupled from the cathode.

In one application, ionizing radiation and/or high-energy particles impinge upon the detector crystal to create electron-hole pairs. As a result of an electric field created within the detector crystal by electrical potentials applied to the cathode and anode, liberated electrons of the electron-hole pairs are directed towards the anode. In the case of an ideal detector, all liberated electrons drift towards the anode where they are collected and the holes drift towards the cathode where they are collected. In an actual implementation, however, liberated electrons can be trapped by holes or surface states within the detector crystal. Liberated electrons collected by the anode provide information about the high-energy photons and/or particles that impinge on the detector crystal. In the preferred embodiment of the present invention, the holes collected by the cathode can also be used to correct for liberated electrons that are not collected by the anode, for example, because they become trapped or drift to the longitudinal surface of the detector crystal.

The high-energy detectors of the present invention can be configured to generate an electric field within the detectors that directs electrons liberated by photons and/or particles that impinge the detector crystal towards an anode located at one end of the detectors. To achieve this, the high-energy detectors of the present invention can include cathodes that are located at an end of the detectors opposite that of the anode and that can extend along a portion of, and in electrical contact with, the longitudinal surface of the detector crystal body. This configuration can prevent the creation of an undesirable defocusing electric field within the detector, which is generally inefficient in directing liberated electrons towards the anode.

The conducting shield of the preferred embodiments surrounds at least a portion of the longitudinal surface of the detector crystal and is decoupled from the cathode. The conducting shield is preferably held at an electrical potential that is substantially equal to the electrical potential of the anode. Using this configuration, an interaction depth of photons and/or particles that are impinge upon the detector crystal can be determined and electron losses due to, for example, trapping can be corrected.

The preferred embodiments of the present invention are configured to electrically shield the detector crystal to substantially reduce or eliminate electrostatically unshielded area, making the detector resilient to electrostatic interference. The high-energy detectors described herein can be configured to focus an electric field within the detector so that liberated electrons flow towards the anode and can be configured to enable determining interaction depth information of photons and/or particles that impinge upon the detector to correct the electron losses due to trapping. As a result of the above, the preferred embodiments of the present invention can detect photons and/or particles efficiently and with high resolution. For example, the preferred embodiments of the present invention can have an energy resolution of better than 0.7% at 662 keV.

Figures 3A, 3B:
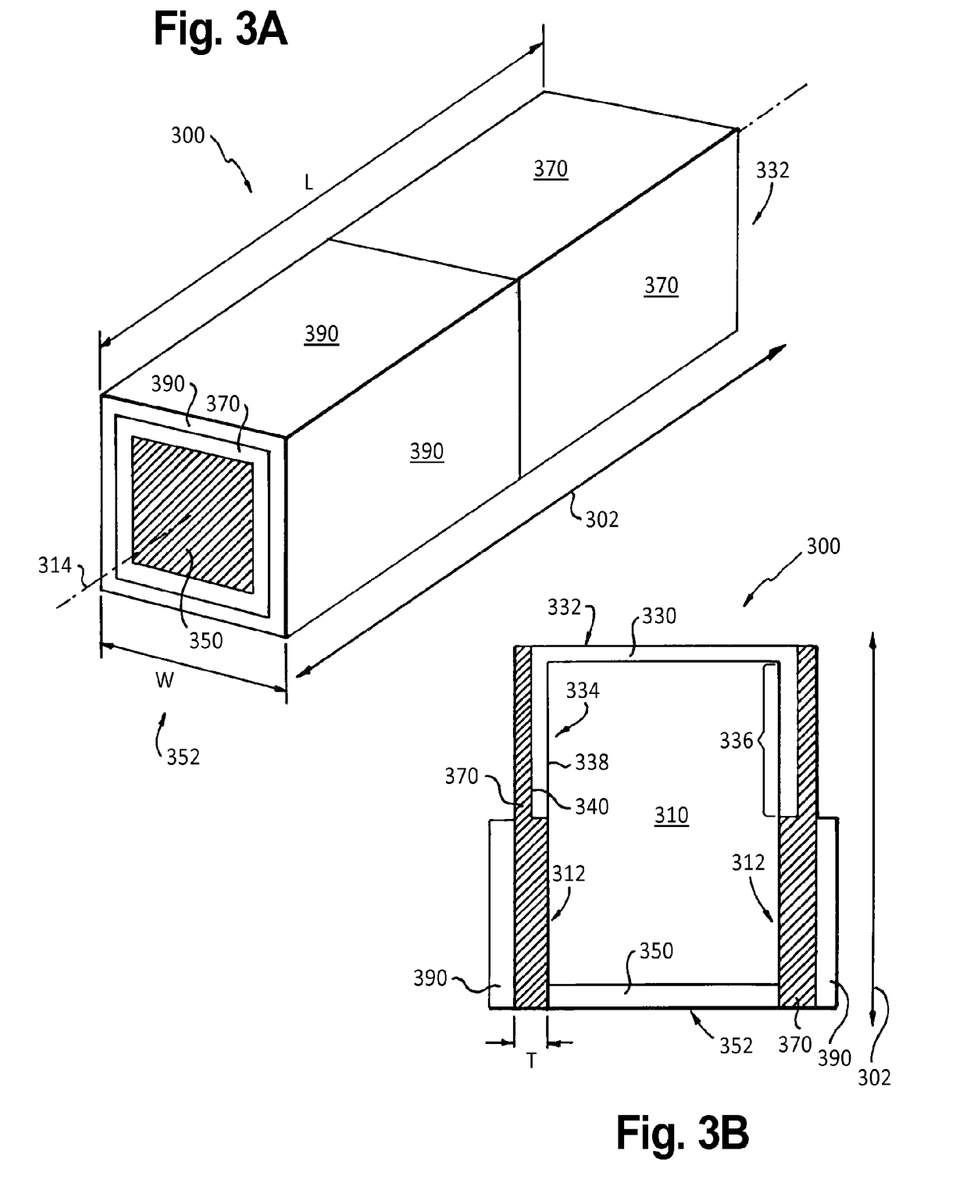
FIGS. 3A-B depict a high-energy detector in accordance with a preferred embodiment of the present invention.
Figure 4:
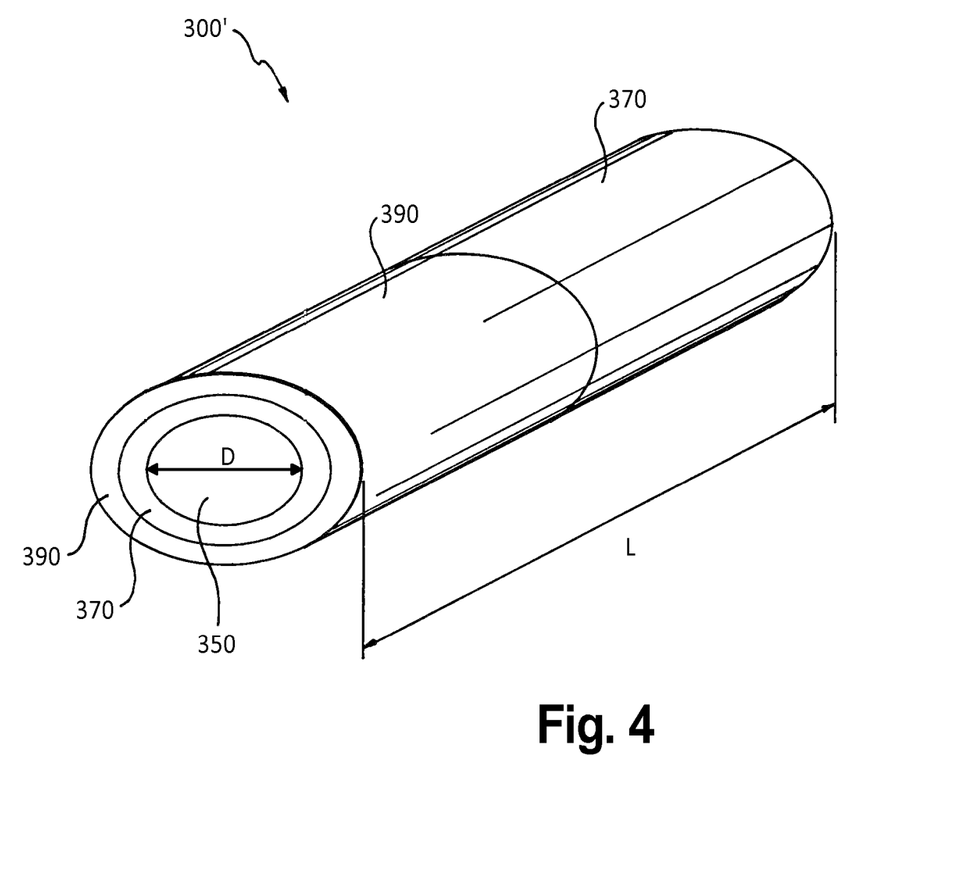
FIG. 4 depicts perspective view of an alternative embodiment of a high-energy detector.

FIG. 3A depicts perspective view a high-energy detector 300 in accordance with the preferred embodiments of the present invention and FIG. 3B depicts a cross-sectional view along the longitudinal axis 302 of the high-energy detector 300 (hereinafter "detector 300"). The detector 300 includes a detector crystal body 310, a cathode 330, an anode 350, an insulator 370, and a conducting shield 390. The detector 300 has a longitudinally extending body, preferably with a rectangular prism or bar-like configuration, although those skilled in the art will recognize other configurations may be implemented, such as, for example, the detector 300', which has a cylindrical or elliptical configuration as shown in FIG. 4. The rectangular configuration of the detector crystal 310 can have a geometrical aspect ratio (a ratio of its cross-sectional width W to its longitudinal length L) of less than 1 and preferably has a geometrical aspect ratio of 0.5 or less. In a preferred embodiment, the detector 300 is configured as a rectangular prism having the geometric dimensions of 5×5× 14 mm$^3$. For embodiments of the detector crystal 310 implemented using a cylindrical configuration, the geometrical aspect ratio is defined as the ratio of the diameter D or major axis of its cross-section to the longitudinal length L of the body (FIG. 4).

The cathode 330 can be disposed at, and in direct electrical contact with, a first end 332 of the detector crystal body 310 and the anode 350 can be disposed at, and in direct electrical contact with, a second end 352 of the detector crystal body 310. In one application, a negative voltage bias can be applied to the cathode 330 and the anode 350 and conducting shield 390 can be held at 0 volts (V). For example, an electrical potential magnitude of about 1000-3000 V can be used for the cathode 330 and a ground potential (e.g., about 0 V) can be used for the anode 350. The cathode 330 and anode 350 preferably cover the surface of the first end 332 and second end 352 of the detector crystal body 310, respectfully. In addition, the cathode 330 preferably has an extended portion 334 that extends from the first end 332 of the detector crystal body 310 along a first portion 336 of the longitudinal surface 312 of the detector crystal body 310 to at least partially and preferably substantially surround the first portion 336 of the longitudinal surface 312.

In one example, the detector 300 can have a longitudinal length L of 10-mm or longer and the cathode 330 can extend 2-3 mm along the longitudinal surface 312 of the detector crystal body 310, about 20%-30% of the detector crystal length. By extending the cathode 330 along a first portion 336 of the longitudinal surface 312 of the detector crystal body 310, a higher electric field gradient can be created on the surface of the detector crystal body 310 than along the detector crystal body's central axis 314, ensuring that a focusing drift electric field is created within the detector crystal body 310.

The cathode 330 and anode 350 can be disposed on the first end 332 and the second end 352, respectively, using deposition techniques known to those skilled in the art, such as physical vapor deposition or chemical vapor deposition. In a preferred embodiment, the cathode 330 and the anode 350 are disposed on the first end 332 and the second end 352 using a physical vapor deposition technique commonly referred to as sputter deposition. The extended portion 334 of the cathode 330 can be formed by deepening the first end 332 of the detector crystal in a solution, such as a gold chloride solution. The cathode 330 and anode 350 can be formed using an electrical conductor, such as a metal including, but not limited to gold, silver, copper, aluminum, or the like.

The insulator 370 surrounds the longitudinal surface 312 of detector crystal body 310 and preferably extends from the first end 332 of the detector crystal body 310 to the second end 352 of the detector crystal body. Where the cathode 330 extends along the first portion 336 of the longitudinal surface 312 of the detector crystal body 310, the insulator 370 surrounds the cathode 330 in this portion 336 so that the insulator 370 is separated from the longitudinal surface 312 of the detector crystal body 310 by the cathode 330. The insulator 370 can be formed using an electrically insulating material that substantially impedes the electric current flow between electrical conductors separated by the insulator 370. The thickness T of the insulator 370 is minimized to ensure acceptable electrostatic shielding of the detector crystal body 310 by the conducting shield 390 and is preferably less than about 100 um thick. The insulator 370 can be formed by, for example, at least one of polyester, polyethylene, polytetrafluoroethylene, a polyimide, or the like, and can be formed by dipping, wrapping, and/or depositing an insulating material. For example, the detector 300 can be dipped in a polymer solution and/or wrapped in a polytetrafluoroethylene or a polyimide tape. Alternatively, or in addition, the insulator 370 can be deposited on the detector using deposition techniques known to those skilled in the art, such as sputtering. In a preferred embodiment, the detector 300 is positioned within a tube of a heat-shrinkable insulating material, such as polyester, and the tube is heated until the tube contracts around the detector 300, after which excess the insulating material may be trimmed.

As used herein the "conducting shield 390" refers to a non-contacting ring, or Frisch ring, around, and electrically insulated from, the detector crystal body 310. The "rings" need not be circular in cross section, and may conform to the cross section of the detector crystal body 310. The conducting shield 390 can be formed from a continuous conductive material or multiple discrete sections of one or more conductive materials so that the conducting shield 390 surrounds at least a portion of the longitudinal surface of the detector 300. The conducting shield 390 is preferably formed from aluminum. However, those skilled in the art will recognize that other electrically conductive materials, such as gold, silver, copper, or the like, can be used to for the conducting shield 390. In a preferred embodiment, the conducting shield 390 surrounds a second portion 392 of the longitudinal surface 312 of the detector crystal body 310 that extends from the second end 352 of the detector crystal body 310 to the first portion 336 of the longitudinal surface 312 of the detector crystal body 310 so that there is no space between the conducting shield 390 and the anode 350 along the longitudinal surface. In some embodiments, the conducting shield 390 can extend into the first portion 336 and/or can extend from the second end 352 to the first end 332 of the detector crystal body 310. The conducting shield 390 is electrically isolated from the detector crystal body 310 and the cathode 330 by the insulator 370 and is preferably at a electrical potential that is substantially equal to the electrical potential of the anode 350. In this manner, the conducting shield 390 and the cathode 330 are electrically decoupled and a high differential bias, for example in excess 3000 V between the cathode 330 and the conducting shield 390, can be achieved.

The conducting shield 390 can be wrapped around the longitudinal surface 312 of detector crystal body 310 or may be physically deposited thereon by, for example, physical or chemical vapor deposition. Thus, the inner surface 338 of the extended portion 334 of the cathode 330 is in contact with the detector crystal body 310, while the outer surface 340 of the extended portion 334 of the cathode 330 is covered by the insulator 370. Similarly, the portion of the detector crystal body 310 not in direct contact with the cathode 330, i.e., not covered by the extended portion 334 of the cathode 330, is covered by the insulator 370 and electrically shielded by the conducting shield 390. There need be no longitudinal gap between the conducting shield 390 and the anode 350, both of which can be kept at substantially the same electrical potential. Electrical contact can be made on cathode 330 and the anode 350 at the first end 332 and second end 352, respectively, which preferably remain bare of insulator 370, so that output signals can be read.

In the preferred embodiment, the conducting shield 390 forms a non-contacting Frisch ring that covers the longitudinal surface 312 which is not covered by the extended portion 334 of the cathode 330. Acting together, the extended portion 334 of the cathode 330 and the decoupled conducting shield 390 substantially shield the longitudinal surface 312 of the detector crystal from electrostatic interference. Since the conducting shield 390 is at an electrical potential that is substantially equal to the electrical potential of the anode 350, the conducting shield 390 can be extended up to the anode 350 to substantially reduce or eliminate any electrically unshielded area around the anode 350. In this manner, the detector crystal body 310 is electrically shielded by the cathode 330, anode 350, and conducting shield 390 to substantially reduce or eliminate electrically unshielded area of the detector crystal body 310. As a result of the configurations described herein, the detector 300 is resilient to electrostatic interference and can have an energy resolution of better than 0.7% at 662 keV.

Figure 5A:
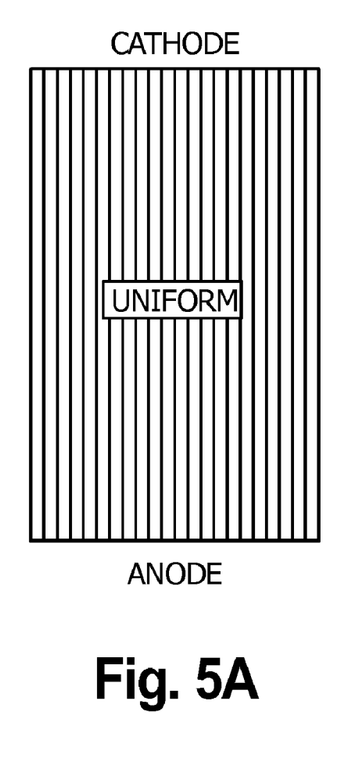
FIGS. 5A-C illustrate electric fields that can be generated within a high-energy detector.
Figure 5B:
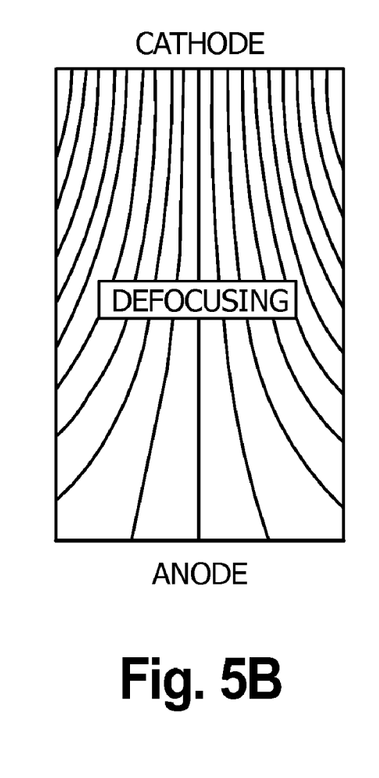
Figure 5C:
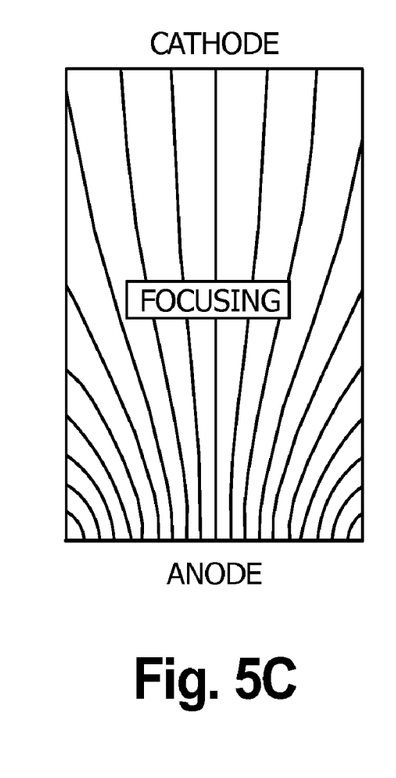

The electric field distribution inside the detector 300 is determined by the boundary conditions (i.e. potential distribution on the longitudinal surface 312), which in turn is determined by the surface leakage current. Depending on the surface potential distributions, there can be three outcomes for the electric field distribution inside the device based on predictions from simulations. These electric field distributions are illustrated in FIGS. 5A-C. In the case of uniform internal electric field shown in FIG. 5A, liberated electrons drift, on average, straight from their point of origin to the anode. If the surface potential decreases from the cathode level toward the anode faster than the potential along the device axes, an undesirable defocusing field shown in FIG. 5A is generated within the detector. Such a field is expected to produce a poor response to detecting high-energy photons and/or particles. On average, liberated electrons created in the detector crystal tend to drift toward the crystal surface 312 where they are more likely to be trapped or to recombine. By extending the cathode 330 along the longitudinal surface 312 of the detector crystal 310, the preferred embodiments of the present invention can prevent the undesirable defocusing field from forming. Instead, a preferred embodiment of the present invention is configured to create the opposite case of a defocusing field, that is, a focusing drift field.

A focusing drift-field as shown in FIG. 5C that is preferably formed within the detector 300 tends to steer liberated electrons towards the anode 350 resulting in fewer liberated electrons, on average, drifting towards the longitudinal surface 312 of the detector crystal body 310 than the uniform and defocusing fields. This allows more liberated electrons to reach the anode 350, and thereby increases the signal energy at the anode 350. The use of the extended cathode 330, as described above, ensures that the surface potential decreases slower than the potential in the center of the detector 300 so that the drift-field pushes liberated electrons away from the longitudinal surface 312 and towards the anode 350, leading to reduced electron trapping.

Figure 6:
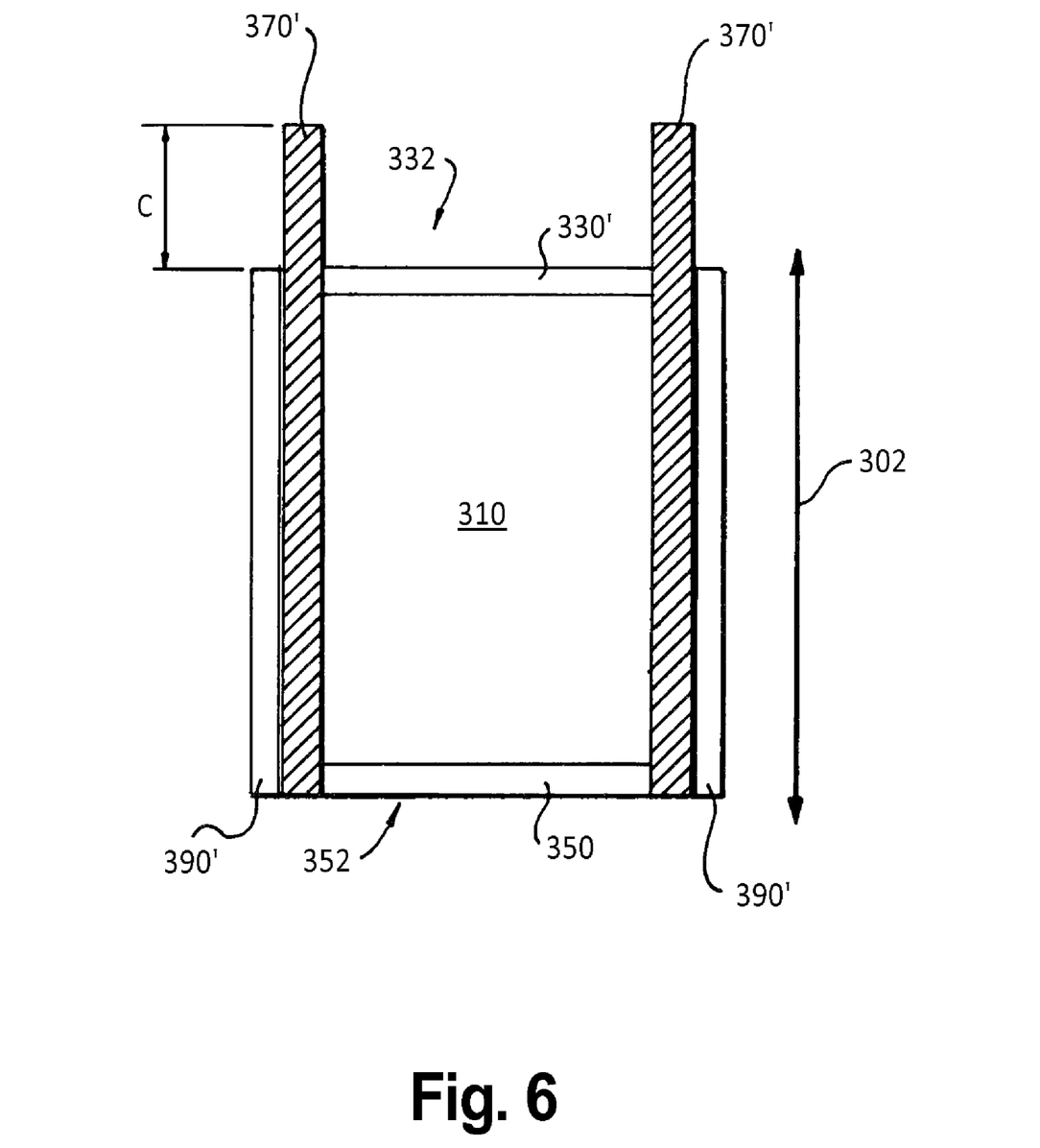
FIG. 6 depicts an alternative embodiment of a high-energy detector that includes an insulator that extends beyond one end of the detector crystal.

FIG. 6 depicts a cross-sectional view along a longitudinal axis 302' of an alternative embodiment of a high-energy detector 300' (hereinafter "detector 300"). The detector 300' includes a detector crystal 310', a cathode 330', an anode 350', an insulator 370', and a conducting shield 390'. The detector 300' has a longitudinally extending body, preferably with a rectangular prism or bar-like configuration, although other configurations may be implemented. The cathode 330' can be disposed at, and in direct electrical contact with, a first end 332' of the detector crystal body 310' and the anode 350' can be disposed at, and in direct electrical contact with, a second end 352' of the detector crystal body 310'. The cathode 330 and anode 350 can be formed using an electrical conductor, such as a metal including, but not limited to gold, silver, copper, aluminum, or the like, and are generally planar.

The insulator 370' surrounds the longitudinal surface 312' of detector crystal body 310' and preferably extends from the second end 352' of the detector crystal body 310' to beyond the first end 332' of the detector crystal body 310'. In one embodiment, the insulator 370' extends about 2-3 mm beyond the first end 332' of the detector crystal body 310'.

The conducting shield 390' surrounds the longitudinal surface 312' of the detector crystal body 310' and extends from the second end 352' of the detector crystal body 310' to the first end 332' of the detector crystal body 310' of the detector crystal body 310'. The conducting shield 390 is electrically isolated from the detector crystal body 310 and the cathode 330' by the insulator 370'. Extending the insulator beyond the first end 332' of the detector crystal body ensures that leakage current and discharge paths between the cathode and the conducting shield are minimized to an acceptable level and are preferably eliminated. In this manner, the conducting shield 390' and the cathode 330' are electrically decoupled and a high differential bias, for example in excess 3000 V between the cathode 330' and the conducting shield 390' can be achieved.

Figure 7:
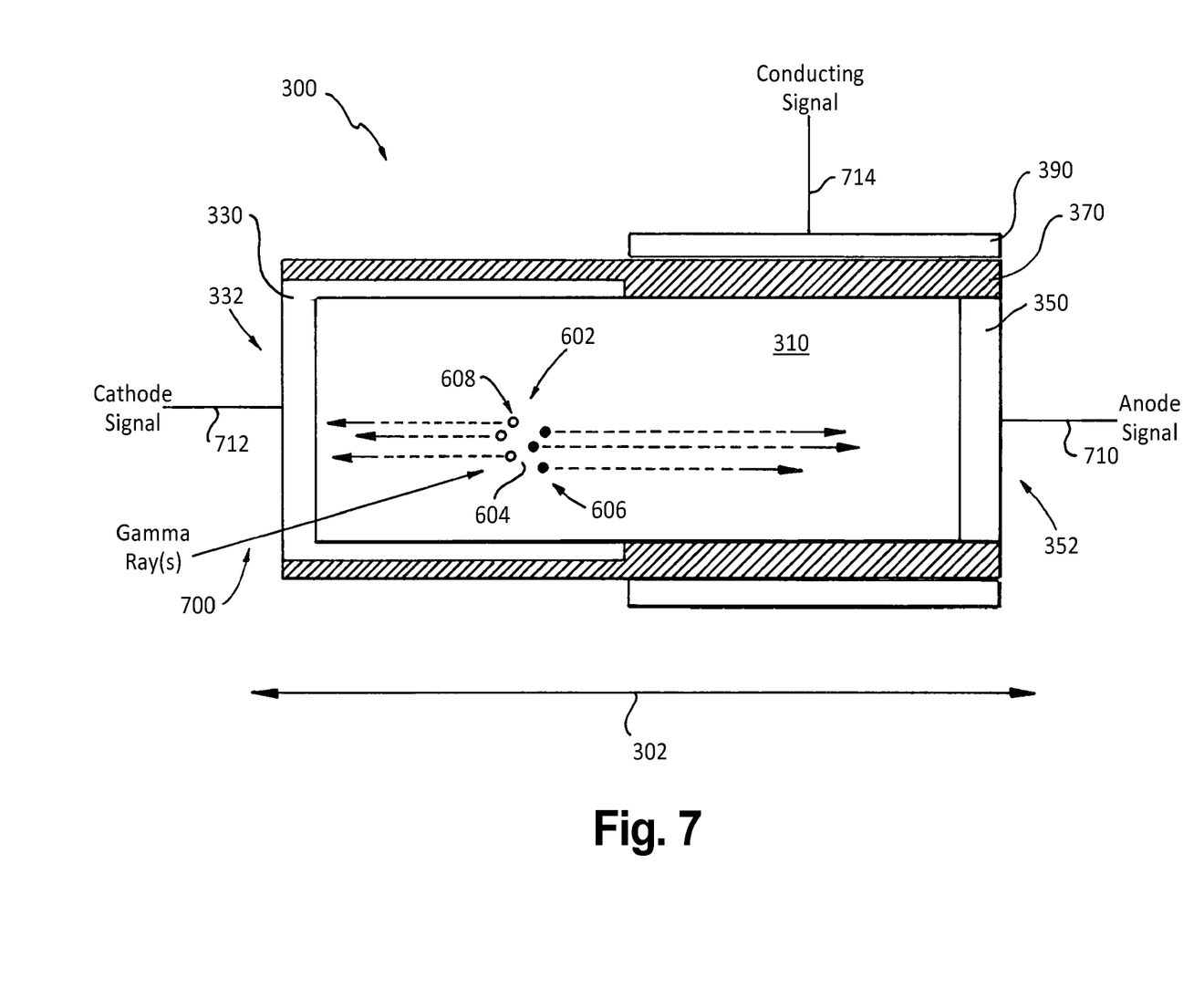
FIG. 7 depicts an exemplary operation of a preferred embodiment of the present invention.

FIG. 7 depicts an exemplary operation of the embodiment of the high-energy detector 300 depicted in FIGS. 3A-B as a gamma-ray detector. In operation, an electrical potential preferably between about 1,000 V and about 3,000 V is applied to the cathode 330 and an electrical potential of preferably about 0 V is applied to the anode 350 and the conducting shield 390. The electrical potentials applied to the cathode 330 and anode 350 are sufficient to create an electric field within the detector 300 that tends to direct liberated electrons towards the anode (e.g. a uniform or focusing drift field). When the high-energy detector 300 is exposed to gamma-rays 700, the gamma-rays 700 impinge upon the detector crystal body 310 at an interaction point 702. The gamma-rays 700 can interact at any depth inside the detector crystal body 310 resulting in a strong dependence of the output signals on the locations of interaction points due generally to low mobility of the holes that to be collected, which can degrade the energy resolution and reduce the efficiency of detectors. This strong dependence, however, is minimized by the conducting shield 390, which along with the cathode 330 and anode 350, electrically shields the detector crystal body 310. As a result, degradation of energy resolution and reduction the photo peak efficiency, which can be attributed to uncollected holes, is minimized in the detector 300.

The high-energy gamma-rays 700 can impinge upon the detector crystal body 310 from any direction, however, it is preferably for the gamma-rays 700 to impinge on the detector crystal body 310 through the first end 332.

One or more electron-hole pairs 704 are created at or near the interaction depth 702. As a result of the electric field generated within the detector 300, liberated electrons 706 of the one or more electron-hole pairs 704 drift towards the anode 350 and holes 708 of the one or more electron-hole pairs 704 drift towards the cathode 330. The anode 350 collects the liberated electrons 706 and an anode signal 710 can be obtained from the anode 350 that represents a number of liberated electrons 706 collected. Some of the liberated electrons 706 can become trapped before reaching the anode 350, and therefore, do not contribute to the anode signal 710. The cathode 330 collects the holes 708 and a cathode signal 712 can be obtained from the cathode 330 that represents a number of holes 708 collected.

Along with the cathode 330 and the anode 350, the conducting shield 390 electrically shields the detector crystal body 310 from electrostatic interference. Applying an electrical potential to the conducting shield 390 that is substantially equal to that electrical potential of the anode 350 allows the conducting shield 390 to extend to the second end 352 of the detector 300 without generating a substantial amount of leakage current between the conducting shield 390 and the anode 350. A large differential potential (e.g., in excess of 3,000 V) between the cathode 330 and the conducting shield 390 can be achieved because the conducting shield 390 is electrically insulated from the cathode 330. Also, because the cathode 330 is electrically decoupled from the conducting shield 390, the cathode 330 can be used for sensing the depth of interaction by reading the cathode signals 712 from therefrom. This allows the preferred embodiments of the present invention to implement a charge-loss correction technique that can improve the spectral response as compared to conventional high-energy detectors. The correction of charge loss can be particularly advantageous for detectors having a long longitudinal length (e.g., >10 mm) where electron trapping can be more significant.

The cathode signal 712 provides information pertaining to a number of liberated electrons that have been trapped based on the number of holes collected. By monitoring the number of liberated electrons with the anode 350 and the number of trapped electrons with the cathode 330, it is possible to apply a correction factor that allows for reconstruction of the number of liberated electrons originally created by incident high-energy particles or radiation (e.g., gamma-rays).

Figure 8:
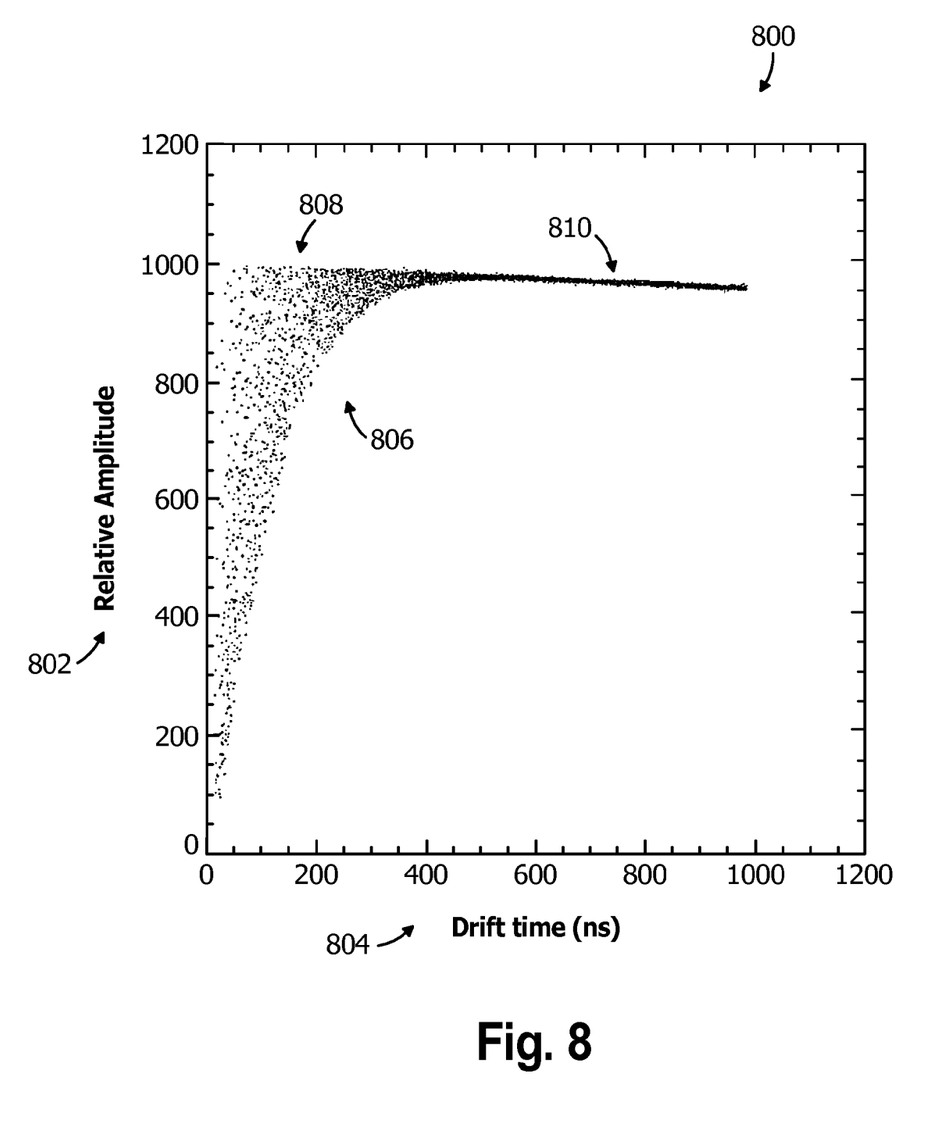
FIG. 8 illustrates a dependence on the amplitude of the output signal versus the drift-time (interaction depth)

In some embodiments, a rise-time or bi-parametric correction technique can be used. To estimate the fraction of particles or photons absorbed inside a drift region of the detector 300, the attenuation of gamma-rays inside the detector 300 is considered. FIG. 8 is a plot 800 that illustrates a dependence on the amplitude of the output signal versus the drift-time (interaction depth), where the amplitude corresponds to the y-axis 802 and the drift-time corresponds to the x-axis 804. The low boundary 806 of the dots distribution corresponds to interactions along the central axis of the detector 300, while the upper boundary 808 corresponds to interactions occurring near the edges of the detector 300. At a certain distance from the anode 350, the distribution converges into a line 810 that represents a correlation between the detector 300 response and the interaction depth, which is referred to herein as the bi-parametric curve. The slope of the line 810 is determined by the small variation in the weighting potential inside the drift region and electron loss due to trapping. Applying bi-parametric correction techniques known to those skilled in the art can reduce the impact of these effects in the detector 300.

Figure 9:
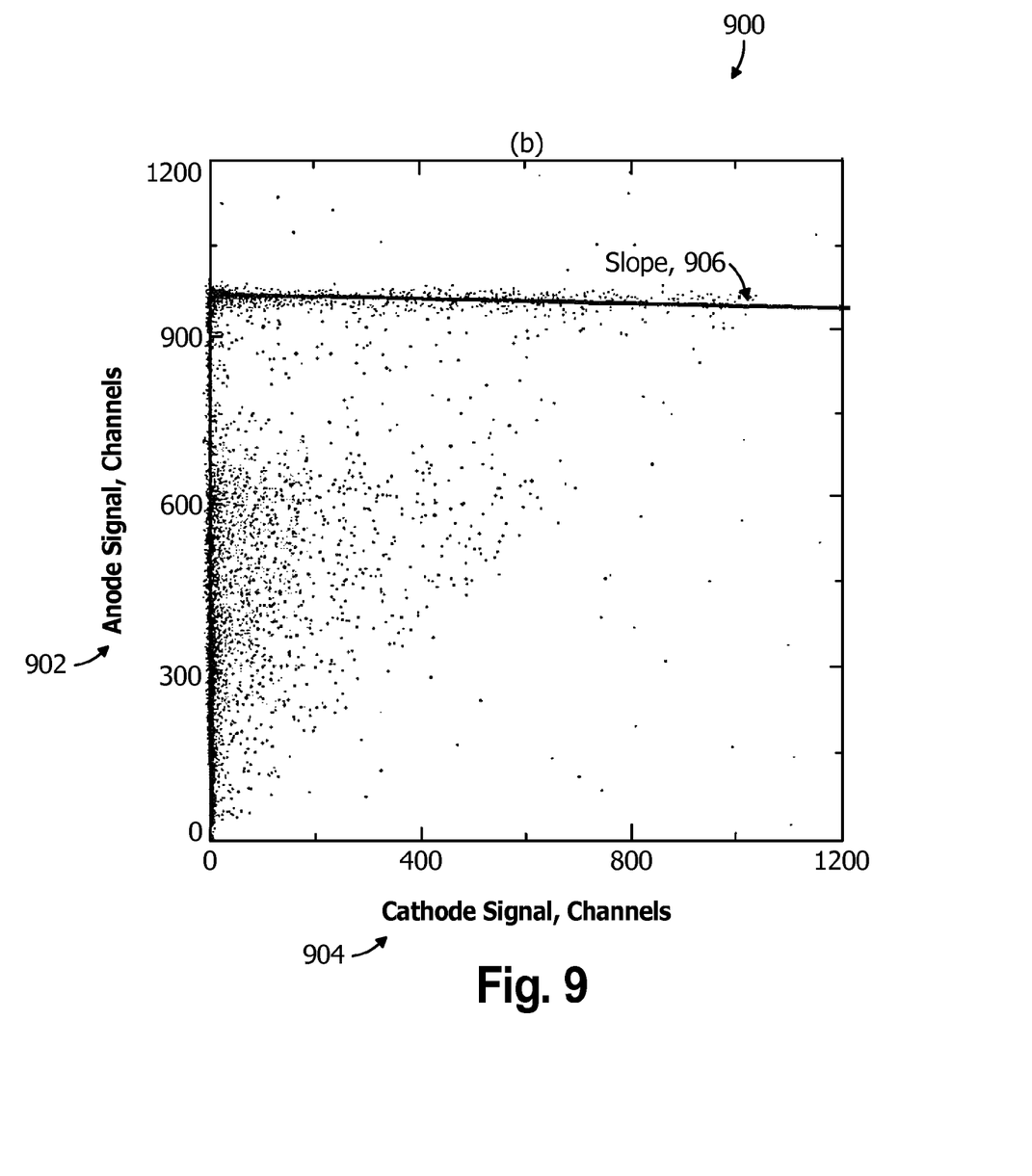
FIG. 9 shows correlations between the signal amplitudes read out from the cathode and anode of a virtual Frisch grid detector.
Figure 10:
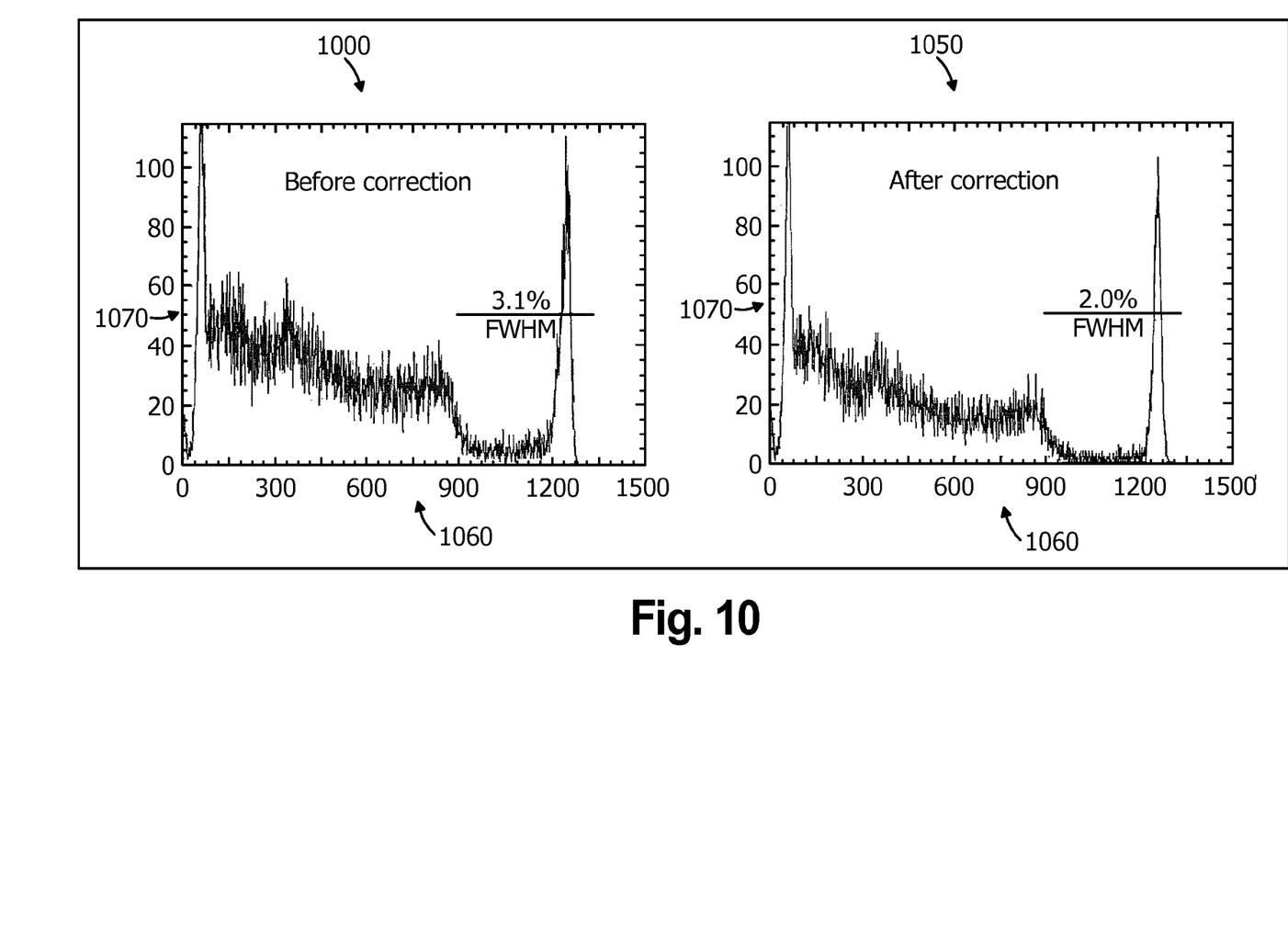
FIG. 10 show pulse-height spectra before and after correction techniques are applied in accordance with the preferred embodiments of the present invention to correct for trapped electrons.

FIGS. 9 and 10 illustrate the charge correction technique implemented in accordance with the preferred embodiments of the present invention. FIG. 9 shows a plot 900 of the correlation between the amplitude of the cathode signal ($A_{cathode}$) and anode signal ($A_{anode}$) generated by monoenergetic gamma rays that impinge upon the detector crystal body 310. The y-axis 902 corresponds to the amplitude of the anode signals and the x-axis 904 corresponds to the amplitude of the cathode signals. The negative slope 906 of the narrow-dots continuum corresponding to the total energy deposition events is an indication of the charge loss, which can be corrected using the following equation:

$$A_{corrected} = A_{anode} + K(A_{cathode}), \quad (1)$$

where K is the slope of the correlation curve (e.g., slope 906). Moreover, the ratio between the cathode and anode signals, $A_{cathode}/A_{anode}$, can be used to reject the events interacting close to the anode. Such events, represented by the dots located close to the y-axis 904, degrade the spectral response of virtual Frisch-grid detectors.

In some embodiments, a signal from the conducting shield 390 can be substituted for the cathode signal. For embodiments that substitute the signal $A_{shield}$ from the conducting shield for the cathode signal, the cathode signal ($A_{cathode}$) in equation (1) can be replaced by the right-hand side of the following equation:

$$A_{cathode} = 1 - A_{anode} + A_{shield}. \quad (2)$$

As an example of the correction technique, FIG. 10 shows plots 1000 and 1050 pulse-height spectra measured from a $^{137}$Cs source with a detector 300 having a longitudinal length of 14-mm. The plot 1000 illustrates the pulse height spectra before applying the interaction depth correction technique and before rejecting the events interacting close to the anode discussed with reference to FIG. 9 and the plot 1050 illustrates the pulse height spectra after applying the interaction depth correction technique and after rejecting the events interacting close to the anode discussed with reference to FIG. 9. The x-axis 1060 of the plots 1000 and 1050 represents the number of channels, which is proportional to the energy detected and the y-axis 1070 of plots represents the number of counts per channel. The correction enabled by reading from the cathode 330 and/or conducting shield 390 reduces the width of the primary energy peak by about one-third from the uncorrected value; thereby improving the energy resolution and accuracy of the detectors described herein. As shown by the plots 1000 and 1050, the resolution improves from 3.1% to 2.0% at 662 keV for this example.

Figure 11:
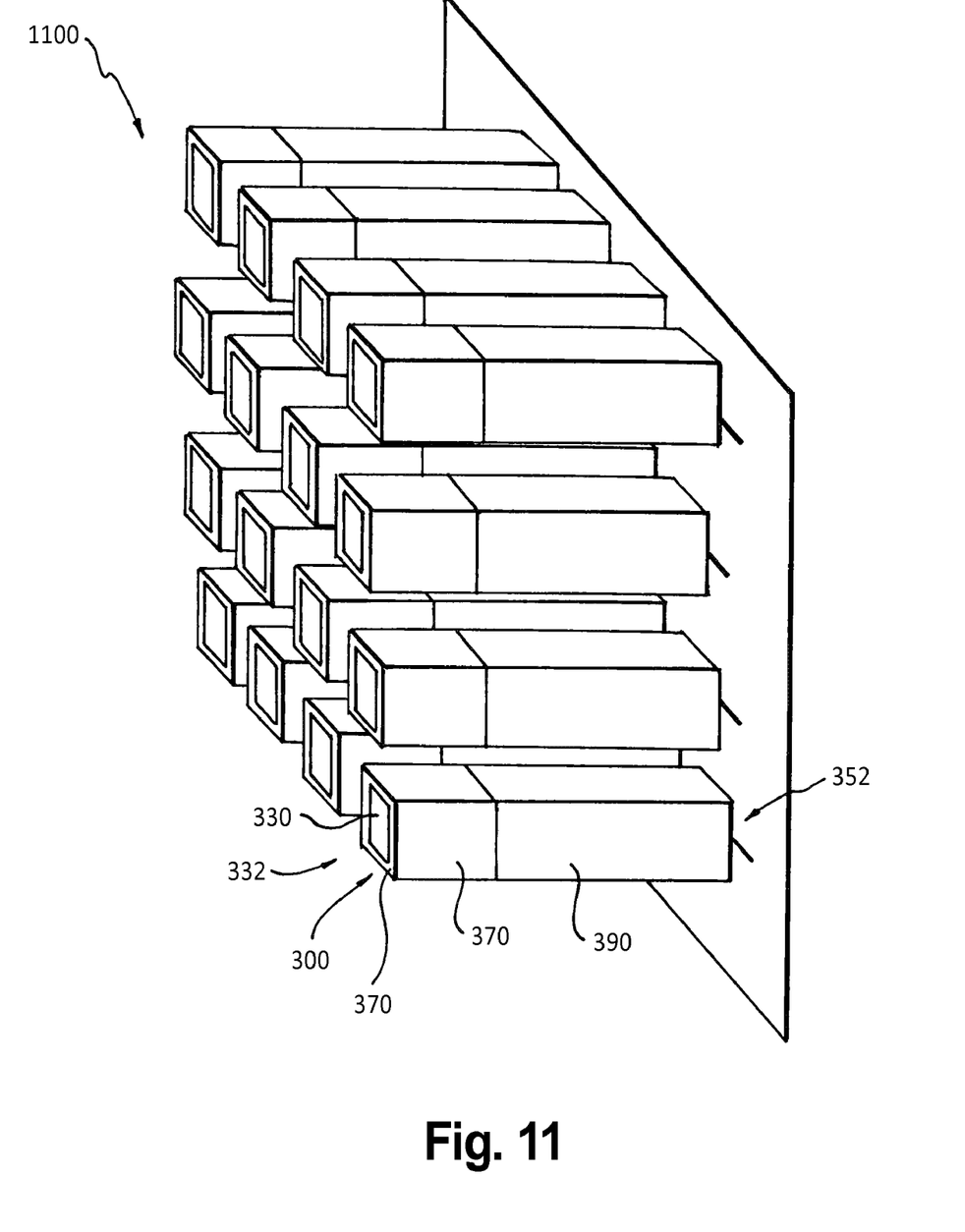
FIG. 11 shows an array of high-energy detectors in accordance with the preferred embodiments of the present invention.

In some embodiments, the detectors disclosed herein can be used to form an array 1100 (or matrix) of detectors as shown in FIG. 11. The array 1100 can be formed to facilitate a large area, position-sensitive gamma-ray detector for spectroscopy and imaging of gamma-rays produced by weak radiation sources. In the illustrated example, a four-by-four (4×4) matrix can be formed using those embodiments of the high-energy detectors depicted in FIGS. 3A-B and FIG. 6. Implementing the detectors in an array or a matrix can increase the energy resolution and sensitivity of the device to facilitate increased accuracy and performance. In one example, the anodes 350 and cathodes 330 of the detectors 300 can be electrically attached to a substrate 1100 so that the anode ends of the detectors 300 are proximally disposed to the substrate and the cathode end of the detectors 300 are distally disposed to the substrate 1100 and connected to a power supply and/or electronic measuring equipment via one or more wires. The array or matrix can be housed in an enclosure to increase the durability of the detector. While the present example illustrates a 4×4 matrix those skilled in the art will recognize that arrays and matrices of different dimensions can be implemented, such as for example, an 8×4 matrix.

The preferred embodiments can be used in a fixed and/or portable application where the detection of high-energy particles is desired and can operate at room temperature. In one example, the preferred embodiments of the detectors described herein can be used in a laboratory where samples may be place in proximity to the detectors and for which the detectors can determine the composition of the samples based on the high-energy radiation or particles emitted from the samples. In another example, the high-energy detectors described herein can be used in a portable field application where the detectors can be used to determine the composition of materials associated with, for example, a dirty bomb. As a result of the preferred embodiments of the present invention, operators of the high-energy detectors described herein can locate and identify radioactive material with more resolution and more accurately than convention high-energy detectors.

While the foregoing description has been made with reference to individual embodiments of the invention, it should be understood that those skilled in the art, making use of the teaching herein, may propose various changes and modifications without departing from the invention in its broader aspects. For example, although the detectors have been described as having an aspect ratio less than one, it is possible to use detector crystals with aspect ratios equal to or greater than one. Similarly the detectors described herein may be of any practical length rather than be limited to 10 mm. The foregoing description being illustrative, the invention is limited only by the claims appended hereto.

The invention claimed is:

1. An ionizing radiation detector comprising:
   a cathode;
   an anode;
   a Frisch-ring shielding electrode;
   an insulator;
   a detector crystal having a body extending longitudinally, said body having first and second ends,
   wherein said cathode surrounds a first portion of the longitudinal surface of said body, extending from the first end along said body, and is in electrical contact with the surfaces of the first end and the first portion,
   wherein said anode is in electrical contact with the surface of the second end,
   wherein said Frisch-ring surrounds only a second portion of the longitudinal surface of said body, extending from the second end along said body, such that the first and second portions do not overlap,
   and wherein said insulator surrounds said second portion, between said body and said Frisch-ring, and said insulator electrically isolates said Frisch-ring from said body and said cathode, and
   said body being electrically shielded by said cathode, anode, and Frisch-ring from electrostatic interference.

2. The ionizing radiation detector of claim 1, wherein said body comprises at least one of a rectangular cross-section, circular cross-section, or an elliptical cross-section.

3. The ionizing radiation detector of claim 2, wherein said body comprises the rectangular cross-section and a ratio of a length of the longest side of said cross-section to the longitudinal length of said body is less than one.

4. The ionizing radiation detector of claim 2, wherein said Frisch-ring conforms to the cross sectional shape of said body.

5. The ionizing radiation detector of claim 4, wherein said Frisch-ring is formed from a continuous conductive material.

6. The ionizing radiation detector of claim 4, wherein said Frisch-ring is formed from multiple discrete sections of one or more conductive materials.

7. The ionizing radiation detector of claim 1, wherein said insulator extends longitudinally from the second end to beyond the first end of said body.

8. The ionizing radiation detector of claim 1, wherein a different electrical potential is applied to said cathode and said anode to create an electric field within said body that is sufficient to direct liberated electrons towards said anode.

9. The ionizing radiation detector of claim 8, wherein an electrical potential of said Frisch-ring is substantially equal to that of said anode.

10. The ionizing radiation detector of claim 1, wherein said Frisch-ring comprises at least one of copper and aluminum.

11. The ionizing radiation detector of claim 1, wherein said insulator comprises at least one of polyester, polyethylene, polytetraflouroethylene, and a polyimide.

12. The ionizing radiation detector of claim 1, wherein said insulator extends from the second end to the first end of said body and surrounds the longitudinal surface of said body and the part of said cathode extending from the first end of said body along the first portion of the longitudinal surface of said body between said body and said insulator so that said cathode is in direct electrical contact with the first portion of the longitudinal surface of said body and said insulator is separated from the first portion of the longitudinal surface of said body by said cathode.

13. The ionizing radiation detector of claim 1, wherein said ionizing radiation detector is a gamma-ray detector.

14. The ionizing radiation detector of claim 1, wherein said cathode extends from the first end of said body along, and in electrical contact with, the longitudinal surface of said detector crystal body for between 20-30 percent of the detector crystal length.

15. The ionizing radiation detector of claim 1, wherein said insulator extends beyond said second portion into said first portion to surround at least part of said cathode.

16. The ionizing radiation detector of claim 1, wherein said cathode, said anode, and said Frisch-ring are comprised of gold, silver, copper, or aluminum.

17. The ionizing radiation detector of claim 1, wherein a thickness of the insulator is less than 100 um thick.

18. The ionizing radiation detector of claim 1, wherein said insulator is formed from at least one of polyester, polyethylene, polytetrafiouroethylene, or a polyimide.

19. The ionizing radiation detector of claim 1, wherein said detector crystal is formed from a semiconductor material including at least one of Cadmium Zinc Telluride (CdZnTe), Cadmium Telluride (CdTe), or Mercury Iodide (HgI2).

20. An ionizing radiation detector device, wherein said ionizing radiation detector device is composed of an array of ionizing detectors according to claim 1.

21. The ionizing radiation detector device of claim 20, wherein the array is a 4 by 4 array of ionizing radiation detectors.

22. A method of creating an ionizing radiation detector comprising:
forming a cathode at a first end of a detector crystal body, which extends from the first end along a longitudinal surface of said detector crystal body to surround a first portion of said detector crystal body, said cathode in electrical contact with the surfaces of the first end and the first portion of said detector crystal body;
forming an anode on a second end of said detector crystal body, said anode in electrical contact with the surface of the second end;
forming an insulator around the longitudinal surface of said detector crystal body and extending from the second end along said detector crystal body;
forming a Frisch-ring shielding electrode over a second portion of the longitudinal surface of said detector crystal body, wherein said Frisch-ring surrounds only the second portion, extending from the second end along said detector crystal body, such that the first and second portions do not overlap,
wherein said Frisch-ring is in direct contact with said insulator, which is formed between said detector crystal body and said Frisch-ring and electrically isolates said Frisch-ring from said detector crystal body and said cathode, and
said detector crystal body being electrically shielded by said cathode, anode, and Frisch-ring from electrostatic interference.

23. The method of claim 22, wherein said insulator extends beyond said second portion into said first portion to surround at least part of said cathode.

24. The method of claim 22, wherein disposing said insulator comprises:
positioning said detector crystal body within a tube of heat-shrinkable polymer; and applying to said tube heat sufficient to shrink said tube.

25. A method of detecting ionizing radiation comprising:
applying a first electrical potential at an anode disposed on a first end of a detector crystal body to a first potential;
applying a second electrical potential at a cathode disposed on a second end of said detector crystal body;
applying a third electrical potential to an electrically conducting shield, said electrically conducting shield extending longitudinally along a longitudinal surface of said detector crystal body and surrounding at least a portion of the longitudinal surface of said detector crystal body, said conducting shield extending longitudinally to the second end and being electrically isolated from said detector crystal body and said cathode by an insulator, the third electrical potential being substantially equal to that of the first electrical potential;
reading an output at said anode corresponding to a number of electrons collected by said anode;
reading an output at said cathode corresponding to a number of trapped electrons; and
determining a number of originally liberated electrons based on the number of collected electrons and the number of trapped electrons.

26. The method of claim 25, wherein determining the number of originally liberated electrons comprises summing the number of collected electrons with the product of the number of trapped electrons multiplied by a correction factor.

27. The method of claim 25, further comprising setting the first electrical potential and second electrical potential to sufficiently different voltages to create an electric field within the detector crystal body that focuses electrons towards the anode.

* * * * *